(12) United States Patent
Rowe et al.

(10) Patent No.: US 7,926,053 B1
(45) Date of Patent: Apr. 12, 2011

(54) METHODS AND APPARATUS FOR OPTIMIZING INSTALLATION LOCATION OF SOFTWARE

(75) Inventors: Edward R. Rowe, Sunnyvale, CA (US);
Brent E. Rosenquist, San Jose, CA (US); David G. Sawyer, San Jose, CA (US); Dylan Ashe, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1401 days.

(21) Appl. No.: 11/212,143

(22) Filed: Aug. 26, 2005

(51) Int. Cl.
*G06F 9/445* (2006.01)
*G06F 9/44* (2006.01)
*G01R 31/00* (2006.01)

(52) U.S. Cl. .................... 717/175; 717/127; 702/119
(58) Field of Classification Search .................. None
See application file for complete search history.

(56) References Cited

U.S. PATENT DOCUMENTS

| | | | |
|---|---|---|---|
| 5,857,101 A * | 1/1999 | Ballard et al. | 713/1 |
| 6,202,121 B1 * | 3/2001 | Walsh et al. | 711/100 |
| 6,854,601 B2 * | 2/2005 | Patil | 210/484 |

OTHER PUBLICATIONS

Hennessy & Patterson, "Computer Architecture: A Quantitative Approach" 1996, Morgan Kaufmann Publishers, 13 pages (various excerpts).*
Flickenger, "Speeding up Linux Using hdparm", Jun. 29, 2000, O'Reilly linuxdevcenter.com (<http://linuxdevcenter.com/pub/a/linux/2000/06/29/hdparm.html>), 4 pages.*
Author Unknown, "Speeding the Best-First Search for Determining Phonetic Baseforms", Nov. 1, 1991, IBM Technical Disclosure Bulletin, Nov. 1991, US, vol. 34, Issue 6, pp. 480-481, TDB-ACC-No. NN9111480.*

* cited by examiner

*Primary Examiner* — James D Rutten

(57) ABSTRACT

A system installs an application by identifying a file set indicating files accessed during operation of the application. The system identifies a set of available storage areas that are accessible to a computerized device, and that are capable of storing files in the file set. The system identifies a performance metric associated with each of the storage areas in the set of available storage areas, and positions files from the file set into at least one storage area of the set of available storage areas. The files are positioned based on the performance metrics associated with the one storage area.

31 Claims, 9 Drawing Sheets

201 IDENTIFYING A PLURALITY OF ASSOCIATED FILES THAT ARE ACCESSED BY THE APPLICATION DURING STARTUP OF THE APPLICATION

202 INSTALL THE APPLICATION ON THE COMPUTERIZED DEVICE

203 EXECUTE THE APPLICATION ON THE COMPUTERIZED DEVICE

204 MONITOR THE EXECUTION OF THE APPLICATION

205 RECORD A PLURALITY OF FILE IDENTITIES THAT ARE ACCESSED DURING THE EXECUTION OF THE APPLICATION

206 SORT THE PLURALITY OF FILE IDENTITIES IN ORDER OF ACCESS DURING THE EXECUTION OF THE APPLICATION

207 WHEREIN THE STEPS OF INSTALL, EXECUTE, MONITOR, RECORD, AND SORT ARE PERFORMED ON A FIRST COMPUTERIZED DEVICE, AND THE STEPS OF IDENTIFY A FILE SET, IDENTIFY A SET OF AVAILABLE STORAGE AREAS, IDENTIFY A PERFORMANCE METRIC, AND POSITION FILES FROM THE FILE SET ARE PERFORMED ON A SECOND COMPUTERIZED DEVICE

*FIG. 3*

206 SORT THE PLURALITY OF FILE IDENTITIES IN ORDER OF ACCESS DURING THE EXECUTION OF THE APPLICATION

209 EXECUTE A FILE FILTERING PROCESS ON THE PLURALITY OF FILE IDENTITIES THAT ARE ACCESSED DURING THE EXECUTION OF THE APPLICATION, THE FILE FILTERING PROCESS CONVERTING THE PLURALITY OF FILE IDENTITIES TO A PLURALITY OF MACHINE INDEPENDENT PATH AND FILE NAMES USABLE TO AT LEAST ONE OTHER COMPUTER ON WHICH THE APPLICATION IS INSTALLED

210 COMPUTE A PLURALITY OF UNIQUE FILE PATH NAMES FROM THE PLURALITY OF FILE IDENTITIES, THE UNIQUE FILE PATH NAMES INDICATING FILE PATH NAMES THAT ARE UNIQUE TO THE COMPUTERIZED DEVICE

211 STRIP THE VARIABLE PATH FILE NAME FROM EACH OF THE PLURALITY OF UNIQUE FILE PATH NAMES TO CREATE A PLURALITY OF FIXED PATH FILE NAMES THAT ARE NOT UNIQUE TO THE COMPUTERIZED DEVICE

FIG. 4

215 DETERMINE EACH CLUSTER IN THE AVAILABLE STORAGE AREA IS VOID OF DATA

221 TRAVERSE EACH OF THE AVAILABLE STORAGE AREAS TO DETERMINE IF EACH OF THE AVAILABLE STORAGE AREAS HAS THE CAPACITY TO CONTAIN THE FILE SET

222 IDENTIFY AN AVAILABLE STORAGE AREA AS BEING CAPABLE OF CONTAINING THE FILE SET

OR

223 RANK EACH OF THE AVAILABLE STORAGE AREAS FROM A FASTEST PERFORMANCE TO A SLOWEST PERFORMANCE

↓

224 TRAVERSE EACH OF THE AVAILABLE STORAGE AREAS IN ORDER OF A FASTEST PERFORMANCE AVAILABLE STORAGE AREA TO A SLOWEST PERFORMANCE AVAILABLE STORAGE AREA

*FIG. 7*

216 IDENTIFY A PERFORMANCE METRIC ASSOCIATED WITH STORAGE AREAS IN THE SET OF AVAILABLE STORAGE AREAS

226 COMPARE A PERFORMANCE OF A FIRST AVAILABLE STORAGE AREA TO A SECOND AVAILABLE STORAGE AREA TO DETERMINE AN OPTIMAL AVAILABLE STORAGE AREA FOR THE FILE SET

↓

227 DETERMINE A TIME CONSTRAINT FOR THE COMPARISON, THE TIME CONSTRAINT LIMITING AN AMOUNT OF TIME SPENT DETERMINING AN OPTIMAL AVAILABLE STORAGE AREA IN TERMS OF A FILE PERFORMANCE, THE AMOUNT OF TIME SPENT DETRACTING FROM A GAIN INCURRED FROM THE FILE PERFORMANCE

OR

228 IDENTIFY A SEQUENCE NUMBER ASSOCIATED WITH EACH AVAILABLE STORAGE AREA IN THE SET OF AVAILABLE STORAGE AREAS, THE SEQUENCE NUMBER INDICATIVE OF THE PERFORMANCE METRIC FOR THAT AVAILABLE STORAGE AREA

↓

229 THE SEQUENCE NUMBER IS PREDETERMINED BASED ON A LOCATION OF THE STORAGE AREA IN A STORAGE MEDIUM

*FIG. 8*

230 POSITION FILES FROM THE FILE SET INTO AT LEAST ONE STORAGE AREA OF THE SET OF AVAILABLE STORAGE AREAS BASED ON THE PERFORMANCE METRICS ASSOCIATED WITH THE AT LEAST ONE STORAGE AREA

233 FROM THE SET OF AVAILABLE STORAGE AREAS, SELECT AT LEAST ONE AVAILABLE STORAGE AREA HAVING A HIGHEST PERFORMANCE METRIC

234 WRITE THE FILES FROM THE FILE SET INTO THE SELECTED AT LEAST ONE AVAILABLE STORAGE AREA THAT HAS THE HIGHEST PERFORMANCE METRIC

OR

235 PERFORM AN INITIAL INSTALLATION OF FILES INTO THE AVAILABLE STORAGE AREA HAVING THE HIGHEST PERFORMANCE METRIC

*FIG. 9*

METHODS AND APPARATUS FOR OPTIMIZING INSTALLATION LOCATION OF SOFTWARE

BACKGROUND

Conventional computerized devices, such as personal computers, laptop computers, and data communications devices (e.g., routers, switches, gateways and the like) are configured with programs (i.e., software applications, Operating System applications, etc) that install software applications on the computerized device. Often, the software applications to be installed are comprised of large sets of files that include executable files, dynamically linked libraries (DLL), help files, data files, etc. These large sets of files can take up a considerable amount of storage space within a storage medium such as a disk drive that is accessible to the computerized device on which the applications are installed.

Conventional operating systems attempt to optimize the use of any available (i.e., non-occupied) areas of a storage medium such as a disk by installing software applications in fragmented areas of the disk. Fragmented areas of the storage medium are, for example, non-contiguous areas or regions on a disk that are can be written to in order to store data. Disk fragmentation occurs over time as files are written to and then later deleted form the storage medium. When a file is deleted from the storage medium, it creates an area or fragment of free space on the storage medium. When the operating system is installing a new application, the operating system writes data from files to the fragments so that the fragments do not go to waste.

SUMMARY

Conventional technologies for installing applications that are to be accessed by a computerized device suffer from a variety of deficiencies. In particular, conventional technologies for installing applications are limited in that the storage medium fragmenting and placement of portions of files into these fragments that occurs during installation slows down the performance (i.e., launch time, startup time, etc) of the application once it has been installed. This is because the conventional operating system or installation program installs files individually on the disk as space for each file is found, without regard to the disk performance of those available disk spaces, and without regard to the order in which the files will be accessed by the application during startup or run time. By way of example, it may be the case that a software application that is installed requires access to a specific file at launch time (i.e., at startup, after the application has been installed). However, during the installation process, the operating system or other installer program may have placed parts of this single file into various fragments scattered in different locations within the disk drive, thus making the single file a fragmented file. Upon startup of the application that requires access to this fragmented file, the fact that the file is fragmented causes extra disk head movement (as the disk head seeks the location of the next fragment of the file being accessed), thus slowing down disk accesses and increasing the amount of time required to complete the startup or launch of the application.

Embodiments disclosed herein significantly overcome such deficiencies and provide an installation process for installing applications accessed by a computerized device. Embodiments of the invention are based in part on the observation that different regions of a storage medium, such as different physical areas of a hard disk, have different performance metrics. For example, the total amount of storage space contained on outer radial areas of a disk platter that rotate past a head of a disk drive is greater than the amount of storage space contained on the inner radial areas of that same disk platter. As such, in a single revolution of the disk platter, more storage space passes the head on outer areas than on inner areas. Thus more data can be read from or written to the outer areas of a disk in one revolution as compared to the inner areas of that same disk. This information along with fragmentation information can be used by the system disclosed herein to install software in higher performing locations of a disk in order to increase performance and lower total launch and run time of an application.

In one configuration, the installation process identifies a file set comprised of files accessed during operation of the application that is being installed. As an example, the file set may identify those files that an application requires access to during the launch or startup of the application. The installation process identifies a set of available storage areas that are accessible to the computerized device, and that are capable of storing the files in the file set. For example, the installation process can identify a set of outermost areas of the disk that contain regions (i.e. fragments) of sufficient capacity to store the files identified in the file set. The installation process identifies a performance metric associated with the set of available storage areas. The performance metric may be, for example, a metric that indicates relative performance of each identified available region of the storage medium that can accommodate storage of the file in the file set. The installation process then positions the files from the file set in one of the available storage areas based on the performance metric associated with that available storage area. In one configuration, the installation process selects the available storage area(s) with the best performance metric, so that the files are installed in the best performing location of the storage medium in order to provide the most performance when those files are accessed during application operation (e.g. during launch time).

In one configuration, prior to the installation of the file set, a dynamic training process is executed that identifies the file set, and sorts the files in the file set to improve performance of those files during execution of the application that accesses those files. The files are sorted in order of access by the application. As an example, the dynamic training process can monitor the launch of an application in order to identify what files are accessed during the launch (e.g. for the first 20 seconds after application startup, or until first user input is received after application launch). The dynamic training process identifies those files (i.e., the ones access during application launch) within the file set comprised of files accessed during operation (e.g., launch in this example) of the application. The dynamic training process can sort the files for example, to remove temp files from the file set.

Once the files have been identified, and sorted, the installation process identifies available storage areas large enough to contain the whole file set. If there is no individual available storage area large enough to accommodate the whole file set, multiple adjacent available storage areas in high performing regions of the storage medium are sought in order to keep the files in the file set together. In one configuration, an effort is made to install the file set in as few adjacent areas of available storage areas as possible. Installing the files on the available disk space as a group in one or more adjacent high performing regions instead of individual files spread throughout the disk improves performance of the application that accesses those files, since less time is lost seeking the location of those related files.

In one configuration, the installation process also measures the speed of those available disk spaces prior to installing the files in order to find the fastest possible available areas of disk space in which to install the file sets. The process of measuring the speed of the available disk spaces is performed without contamination from caches effects by writing the files as data, then reading the files as image files (e.g. as executable files, instead of data files), and measuring the time needed to perform the reads. A true measurement of time is calculated, enabling a true comparison of performance between the available disk spaces.

During an example operation of one embodiment, suppose a software application, accessible to a computer, such as a development suite, is to be installed. The installation process identifies all the files required to open, launch, run or otherwise perform or execute an instance of the development suite for a given period of time (e.g. the first minute of operation, or until user input is received after launch). The files identified can be those used at launch, or those used during some other operation of the application that requires high performance. The installation process identifies a set of available storage areas, accessible to the computer, that are capable of storing the files needed to run the development suite, and identifies a performance metric associated with each available storage area. The performance metrics indicate the fastest performing available disk areas for the files. The installation process then positions the files from the file set into one or more of the available storage areas based on the performance metric associated with the storage area(s), such that, when the development suite is accessed, the launch time is optimized. If more than one storage area is needed, adjacent available storage areas are identified.

The files associated with the development suite are identified earlier in the installation process during a dynamic training process, such as a file list generation process. The file list generation process is performed after or during installation of the development suite on the computer. The development suite is installed, and the file list generation process executes the development suite. During the execution of the development suite, the file list generation process monitors the execution, and records the names of the files accessed by the development suite. The file names are sorted in the order in which they will be accessed by the development suite. The file names are converted from variable file names (i.e., machine dependent file names) to virtualized path names (i.e., machine independent file names) during generation of the file list generation process. The virtualized path file names are then run through a file filtering process, where some of the fixed path file names may be removed, based on a set of pre-defined rules.

In one embodiment, the file list generation process (containing virtualized path file names of the files accessed by the development suite during execution) is executed on a computer system other than the computer system on which the file list generation process was generated.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 illustrates a flowchart of a procedure performed by the system of FIG. 1 when the installation process identifies a plurality of associated files that are accessed by the application during startup of the application, according to one embodiment disclosed herein.

FIG. 4 illustrates a flowchart of a procedure performed by the system of FIG. 1 when the installation process sorts the plurality of file identities in order of access during the execution of the application, according to one embodiment disclosed herein.

FIG. 7 illustrates a flowchart of a procedure performed by the system of FIG. 1 when the installation process determines each cluster in the available storage area is void of data, according to one embodiment disclosed herein.

FIG. 8 illustrates a flowchart of a procedure performed by the system of FIG. 1 when the installation process identifies a performance metric associated with storage areas in the set of available storage areas, according to one embodiment disclosed herein.

FIG. 9 illustrates a flowchart of a procedure performed by the system of FIG. 1 when the installation process positions files from the file set into at least one storage area of the set of available storage areas based on the performance metrics associated with the at least one storage area, according to one embodiment disclosed herein.

DETAILED DESCRIPTION

Embodiments disclosed herein include methods and a computer system that perform an installation process of software for access by a computerized device. The installation process identifies a file set comprised of files accessed during operation of the application that is to be installed. A set of available storage areas is identified that are accessible to the computerized device, and capable of storing the files in the file set. A performance metric associated with the set of available storage areas is identified. The files from the file set are then positioned in one of the available storage areas based on the performance metric associated with that available storage area.

In once configuration, prior to the installation of the file set, a dynamic training process, such as a file list generation process, is executed that identifies the file set, and sorts the files in the file set to improve performance of those files during execution of the application that accesses those files. The files are sorted in order of access by the application.

Figure 1:
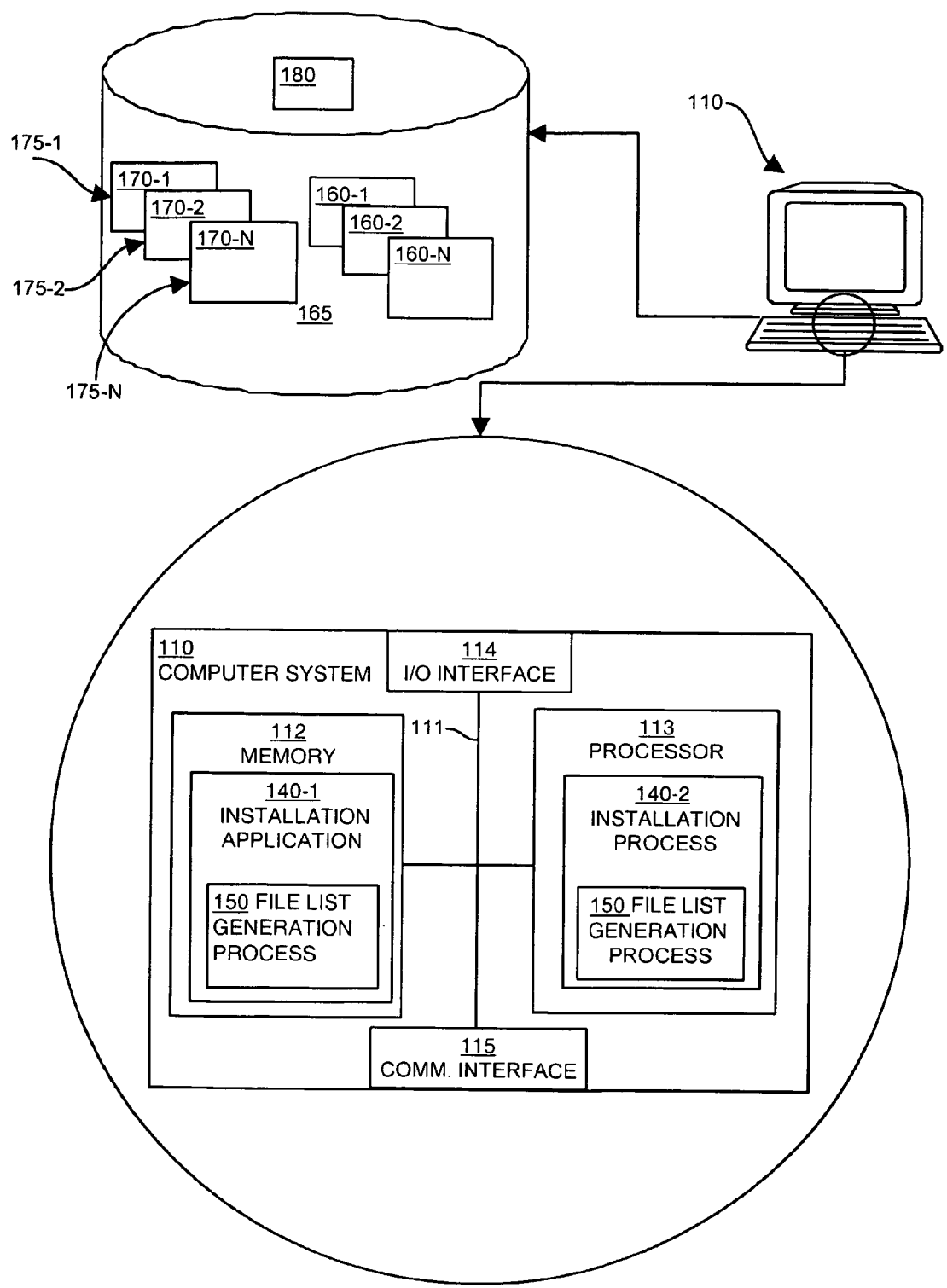
FIG. 1 shows a high-level block diagram of a computer system according to one embodiment disclosed herein.

FIG. 1 is a block diagram illustrating example architecture of a computer system 110 that executes, runs, interprets, operates or otherwise performs an installation application 140-1 and installation process 140-2 that includes a file list generation process 150 suitable for use in explaining example configurations disclosed herein. The computer system 110, that has access to a database 165 containing file sets 160-N of files accessed during operation of an application 180, may be any type of computerized device such as a personal computer, workstation, portable computing device, console, laptop, network terminal or the like. The database 165 contains available storage areas 170-N and performance metrics 175-N associated with the available storage areas 170-N. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with an installation application 140-1 that includes a file list generation process 150 identifying the file sets 160-N accessed during operation of the application 180 as explained herein. The installation application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the installation application 140-1. Execution of installation application 140-1 in this manner produces processing functionality in an installation process 140-2. In other words, the installation process 140-2 represents one or more portions or runtime instances of the installation application 140-1 (or the entire installation application 140-1) performing or executing within or upon the processor 113 in the computerized device 110 at runtime. The file list generation process 150 is included in this processing and operates as explained herein to identify identifying the file sets 160-N accessed during operation of the application 180, and the order in which the file sets 160-N are accessed.

It is noted that example configurations disclosed herein include the installation application 140-1 itself including the file list generation process 150 (i.e., in the form of un-executed or non-performing logic instructions and/or data). The installation application 140-1 may be stored on a computer readable medium (such as a floppy disk), hard disk, electronic, magnetic, optical, or other computer readable medium. The installation application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the installation application 140-1 in the processor 113 as the installation process 140-2 including the file list generation process 150. Those skilled in the art will understand that the computer system 110 may include other processes and/or software and hardware components, such as an operating system not shown in this example.

Further details of configurations explained herein will now be provided with respect to a flow chart of processing steps that show the high level operations disclosed herein to perform the installation process 140-2.

Figure 2:
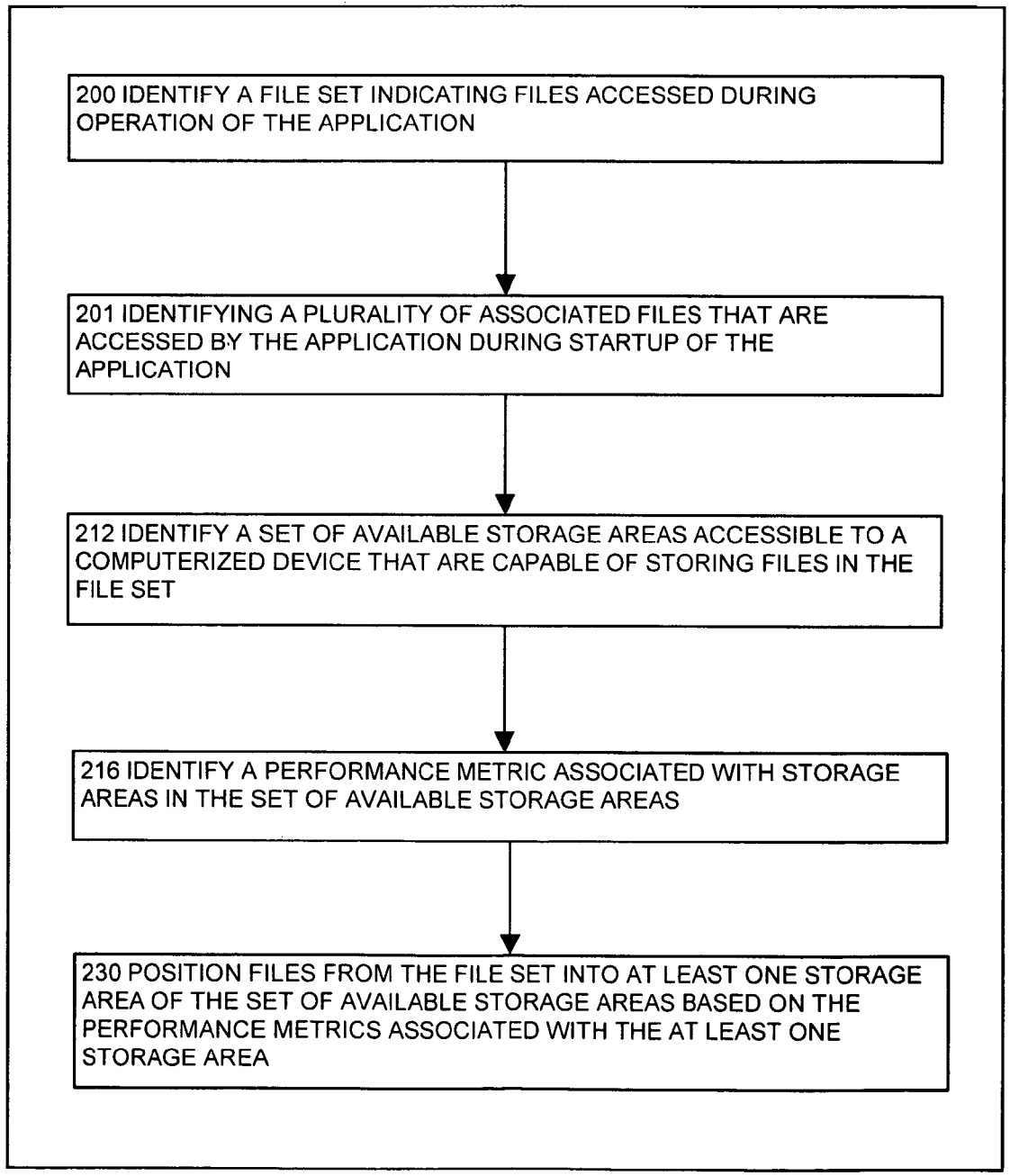
FIG. 2 illustrates a flowchart of a procedure performed by the system of FIG. 1 when the installation process identifies a file set indicating files accessed during operation of the application, according to one embodiment disclosed herein.

FIG. 2 is a flowchart of the steps performed by the installation process 140-2 when it identifies a file set 160-N indicating files accessed during operation of an application 180. The files accessed during the operation of an application 180 can be installed on the computer system 110, or installed on a storage medium that is accessible to the computer system 110.

In step 200, the installation process 140-2 identifies a file set 160-N indicating files accessed (i.e., include files, libraries, help files, etc) during operation of the application 180. The file set 160-N includes all the files required to open, launch, run or otherwise perform or execute an instance of the application 180. The operation of the application, during which time the files are accessed, can be any period of time from startup to completion of execution of the application. In one configuration (as will be discussed below in step 201), the operation of the application for which files being accessed are identified is limited to the launch or startup sequence of the application. This period of time may be, for example, a preset amount of time from startup, such as 20 seconds, during which the application and/or operating require access to any files on disk. In this example then, the installation process 140-2 identifies a file set 160-N indicating files accessed (i.e., include files, libraries, help files, etc) during startup of the application 180. In alternative configuration, the operation of the application can be defined as any period of time during which the application is required to experience the best performance, such as during activation of a certain feature of the application. Any files accessed during the use of this feature are those files that the installation process 140-2 identifies. Techniques for identifying specific files will be explained shortly. In another configuration, all files accessed during the entire execution of an application are identified as files for use by the system explained herein.

In step 201, the installation process 140-2 identifies a plurality of associated files that are accessed by the application 180 during startup of the application 180. Further details regarding identification of the plurality of associated files will be explained in steps 202 through 207 in FIG. 3.

In step 212, the installation process 140-2 identifies a set of available storage areas 170-N accessible to the computer system 110. The available storage areas 170-N that are identified are capable of storing files in the file set 160-N. In one configuration, the available storage areas 170-N exist on the computer system 110. In another configuration, the available storage areas 170-N exist on a storage medium accessible to the computer system 110.

In step 216, the installation process 140-2 identifies a performance metric 175-N associated with storage areas in the set of available storage areas 170-N. In one configuration, each of the available storage areas 170-1 has an associated performance metric 175-1. In another configuration, adjacent areas of available storage areas 170-N have an associated performance metric 175-N. The performance metric 175-N provides the installation process 140-2 with the necessary information to determine the optimal area, out of the available storage areas 170-N, to install the file set 160-N accessed by the application 180. As an example, the performance metric may be a predefined value based on a relative location of a storage area within the total range of storage areas on a disk. In such cases, the performance metric does not need to be calculated in real-time, but is a direct function of (i.e., is directly discernable from) the location of that storage area. In other configurations, the performance metric may be determined in real-time, based on a sample or test access to the disk at that location.

In step 230, the installation process 140-2 positions files from the file set 160-N into at least one storage area of the set of available storage areas 170-N based on the performance metrics 175-N associated with that storage area. In one configuration, the files accessed by the application 180 are positioned into the available storage area 170-1 as a group, based on the relationship among the files. The files are sorted in order of access by the application 180 during start up and/or launch of the application 180.

FIG. 3 is a flowchart of the steps performed by the installation process 140-2 when it identifies a plurality of associated files that are accessed by the application 180 during startup of the application 180. A file list generation process 150 builds the file set 160-N needed for launching or starting the application 180. In one configuration, a list of files contained within the file set 160-N is stored within an installation build. The file list generation process 150 watches an application's 180 read behavior (i.e., the files the application 180 'reads' during launch and/or start up) after the application 180 has been installed, and then locates the files together that are read, based on the read patterns identified by the file list generation process 150.

In step 202, the installation process 140-2 installs the application 180 on the computer system 110. In one configuration, the application 180 installed is the latest version of the application 180 bundled into the latest software release of that application 180.

In step 203, the installation process 140-2 executes the application 180 on the computer system 110. In one configuration, during the execution of the application 180, several test scenarios are executed to mimic typical usage of the application 180.

In step 204, the installation process 140-2 monitors the execution of the application 180 to detect read behavior of the application 180. The installation process 140-2 determines which files are accessed during the execution of the application 180, and in what order they are accessed.

In step 205, the installation process 140-2 records a plurality of file identities that are accessed during the execution of the application 180. The plurality of file identities that are accessed during the execution of the application 180 represent any file that is opened, referenced, etc during the execution of the application 180.

In step 206, the installation process 140-2 sorts the plurality of file identities in order of access during the execution of the application 180. That is, the file identities are sorted in the order the files (represented by the file identities) are accessed by the application 180 during the execution of the application 180. The sorted plurality of file identities will be used to determine the order in which the installation process 140-2 installs the files contained within the file set 160-N. The installation process 140-2 will group together files (represented by the sorted plurality of files identities) that are accessed together.

In one configuration, in step 207, the installation process 140-2 performs the steps of installing, executing, monitoring, recording, and sorting on a first computerized device, and performs the steps of identifying a file set 160-N, identifying a set of available storage areas 170-N, identifying a performance metric 175-N, and positioning files from the file set 160-N, are performed on a second computerized device. In one configuration, the application 180 installed on the first computerized device is from a software build release. When the file set 160-N has been compiled, it is incorporated back into the build release so that, when a second computerized device loads the software build, within the software build are all the file sets 160-N, corresponding to that software build.

FIG. 4 is a flowchart of the steps performed by the installation process 140-2 when it sorts the plurality of file identities in order of access during the execution of the application 180. More specifically, FIG. 4 details the steps performed by the file list generation process 150 to process the plurality of file names to obtain the file set 160-N.

In step 209, the installation process 140-2 executes a file filtering process on the plurality of file identities that are accessed during the execution of the application 180. The plurality of file names that is accessed during the execution of the application 180 is machine dependent to the computer system 110 on which the application 180 was executed. The file filtering process converts the plurality of file identities to a plurality of machine independent path, and file names usable to at least one other computer on which the application 180 is installed.

In step 210, the installation process 140-2 computes a plurality of unique file path names from the plurality of file identities, the unique file path names indicating file path names that are unique to the computer system 110. Each of the plurality of file names is comprised of a variable path file name and a fixed path file name. The variable path name portion of the file name might indicate a special pre-fix path that is unique to the computer system 110. For example, a user might install an application 180 in the "C:\Windows\Applications\" directory. Therefore, an application 180 executable file, for example, "Word.exe", might have a path name of: "C:\Windows\Applications\Company\WordProcessor\Word.exe".

The virtualized path name portion of the file name indicates a path name that is consistent on all the computers that have installed the application 180, in this example, "Company\WordProcessor\Word.exe". The "C:\Windows\Applications\" portion of the path name is the variable path name, because another user might install an application 180 in a different directory on a different computer. The "Company\WordProcessor\Word.exe" portion of the path name is the fixed path name because all users installing an application would have a virtualized path name of "Company\WordProcessor\Word.exe".

In step 211, the installation process 140-2 strips the variable path file name from each of the plurality of unique file path names to create a plurality of virtualized path file names (or machine independent path names) that are not unique to the computer system 110. The variable path file names indicate the exact path name of the file on the computer system 110. Stripping the variable path name from each of the plurality of unique file path names results in a plurality of virtualized path names, indicating path names of files that are the same on any computer on which the application 180 is installed.

In one configuration, the file list generation process 150 converts the plurality of file names to a plurality of machine independent path names (or fixed path names) usable to at least one other computer on which the application 180 is installed. In other words, the file list generation process 150 converts the plurality of file names that are machine dependent to the computer system 110, to a plurality of machine independent path names that are machine independent to any computer system.

In one configuration, the file list generation process 150 filters at least one of the pluralities of fixed path file names, based on at least one rule identified by the file list generation process 150. For example, the file list generation process 150 executes a list of rules contained within a configuration file. The execution of the rules may result in some of the fixed path names being deleted, meaning those fixed path names have not been identified as files not required to be installed as part of the installation process 140-2. For example, an application may access a dynamically linked library (DLL) during execution, such as "FileName.dll". However, "FileName.dll" may be a file that is already installed on the computer system 110 by the Operating System, and not a file that is installed by the installer of the application 180. Thus, the installation process 140-2 does not re-install "FileName.dll" during the installation of the application 180. Therefore, the file list generation process 150 deletes the fixed path name identifying "FileName.dll" from the plurality of file names.

Figure 5:
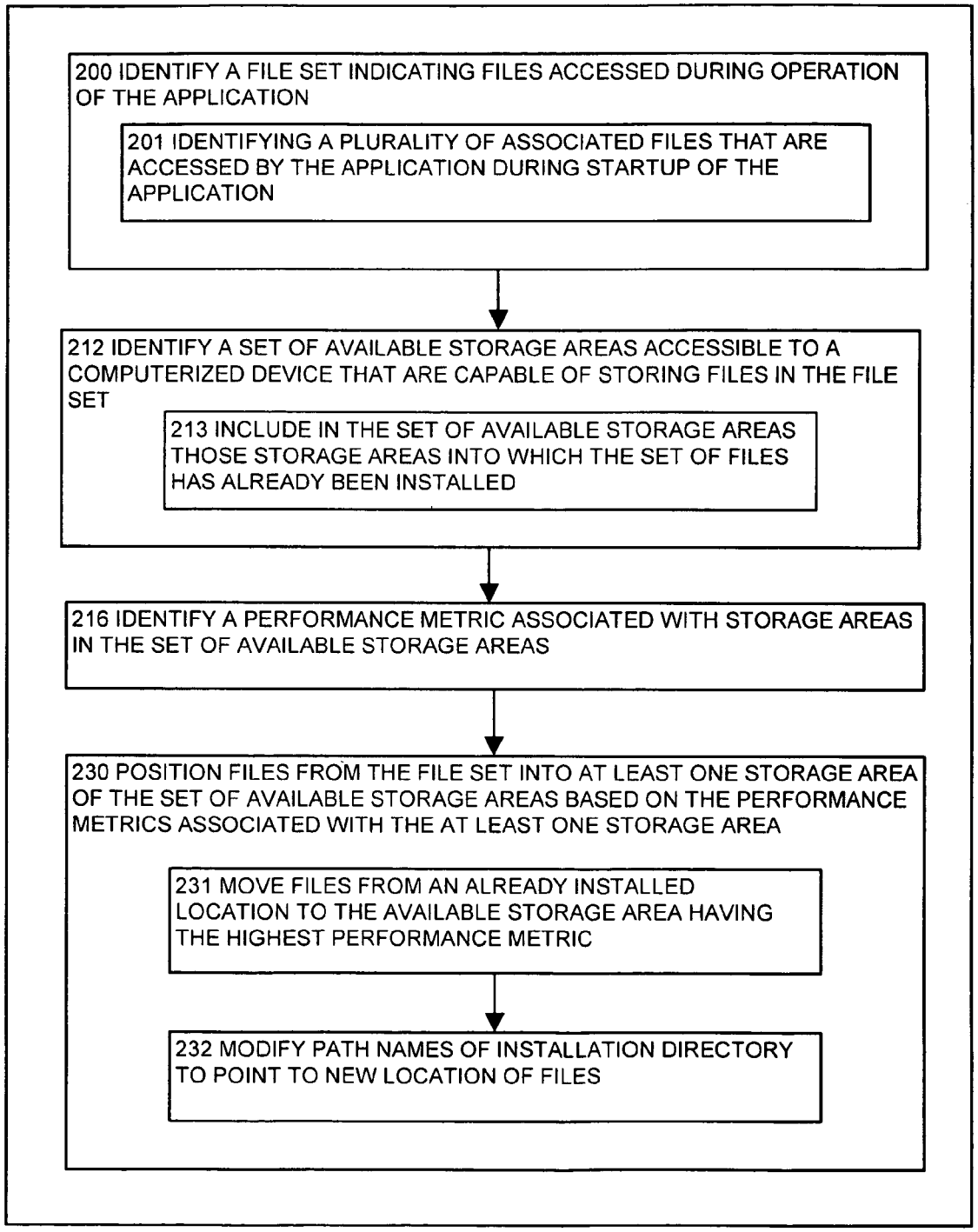
FIG. 5 illustrates a flowchart of a procedure performed by the system of FIG. 1 when the installation process identifies a file set indicating files accessed during operation of the application, according to one embodiment disclosed herein.

FIG. 5 is a flowchart of the steps performed by the installation process 140-2 when it identifies a set of available storage areas accessible to a computer system 110 that are capable of storing files in the file set 160-N. In one configuration, the files in the file set 160-N are identified by installing the application 180 on the computer system 110, executing the application 180, and monitoring the files that are accessed during the execution of the application 180.

In step 213, the installation process 140-2 includes in the set of available storage areas 170-N those storage areas into which the file set 160-N has already been installed. In one configuration, as previously discussed in step 202, the file set 160-N is installed on the computer system 110.

In step 231, the installation process 140-2 moves files from an already installed location to an available storage area 170-2 having the highest performance metric 175-2. In one configuration, the installation process 140-2 determines an available storage area 170-2 has a higher performance metric 175-2 than the storage area 170-1 where the file set 160-1 is currently installed. The installation process 140-2 moves the files set 160-1 from the storage area 170-1 to the available storage area 170-2 that has a higher performance metric 175-2.

In step 232, the installation process 140-2 modifies the path names of the installation directory to point to new location of file set 160-1 that was moved from the storage area 170-1 to the available storage area 170-2 that has a higher performance metric 175-2.

Figure 6:
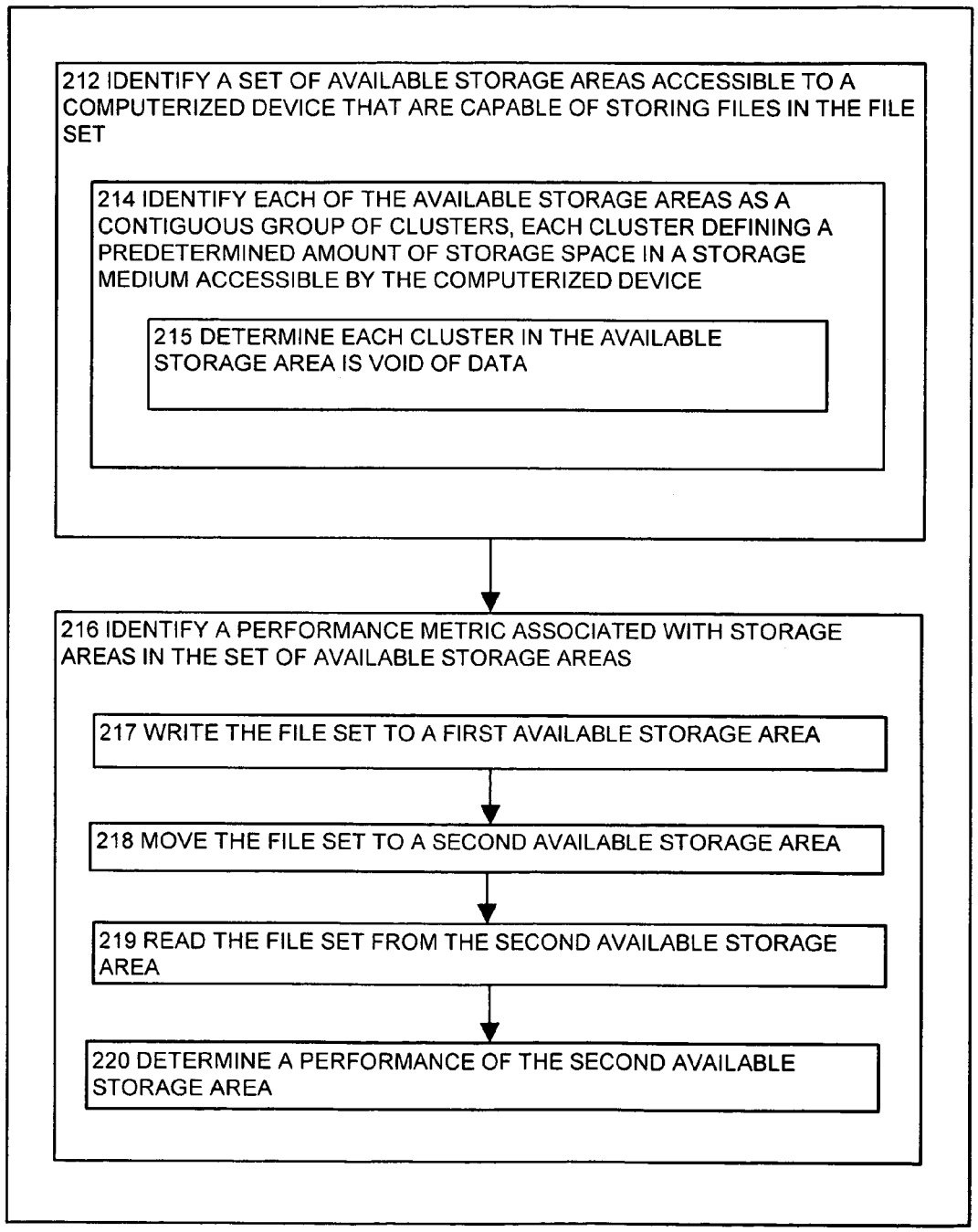
FIG. 6 illustrates a flowchart of a procedure performed by the system of FIG. 1 when the installation process identifies a set of available storage areas accessible to a computerized device that are capable of storing files in the file set, according to one embodiment disclosed herein.

FIG. 6 is a flowchart of the steps performed by the installation process 140-2 when it identifies a set of available storage areas 170-N accessible to the computer system 110 that capable of storing files in the file set 160-N.

In step 214, the installation process 140-2 identifies each of the available storage areas 170-N as a contiguous group of clusters. Each cluster defines a predetermined amount of storage space in a storage medium accessible by the computer system 110. The installation process 140-2 queries a storage medium (i.e., the computer system 110 or a storage medium accessible to the computer system 110) to determine how many clusters exist on the storage medium. In one configuration, contiguous groups of clusters are referred to as a 'hole'.

In step 215, the installation process 140-2 determines each cluster in the available storage area 170-N is void of data. That is, the cluster must be empty in order to be considered to be part of an available storage area 170-N. The installation process 140-2 eliminates any clusters that contain data.

In one configuration, in step 216, the installation process 140-2 identifies the performance metric 175-N associated with storage areas in the set of an available storage areas 170-N by writing, moving and reading the file set 160-1.

In step 217, the installation process 140-2 writes the file set 160-1 to a first available storage area 170-1. In one configuration, the file set 160-1 is written as data files.

In step 218, the installation process 140-2 moves the file set 160-1 to a second available storage area 170-2 so as to avoid disk caching. For example, Windows does not share data and image caches.

In step 219, the installation process 140-2 reads the file set 160-1 from the second available storage area 170-2. The file set 160-1 is written as data files but is read as image files. In doing so, the disk caching is avoided.

In step 220, the installation process 140-2 determines a performance of the second available storage area 170-2, and assigns an associated performance metric 175-2 to that second available storage area 170-2. By avoiding disk caching, a true performance is calculated during step 219, the reading of the file set 160-1 from the location of the second available storage area 170-2.

FIG. 7 is a flowchart of the steps performed by the installation process 140-2 when it determines each cluster in the available storage area 170-N is void of data.

In step 221, the installation process 140-2 traverses each of the available storage areas 170-N to determine if each of the available storage areas 170-N has the capacity to contain the file set 160-N. In one configuration, the installation process 140-2 determines that a adjacent group of available storage areas 170-N has the capacity to contain the file set 160-N. In other words, if one available storage area 170-1 is not large enough to contain the whole file set 160-1, the installation process 140-2 traverses the available storage areas 170-N to determine a adjacent group of available storage areas (i.e., 170-1, 170-2 and 170-3) is large enough to contain the whole file set 160-1.

In step 222, the installation process 140-2 identifies an available storage area 170-1 as being capable of containing the file set 160-N. As the installation process 140-2 traverses each of the available storage areas 170-N, the installation process 140-2 determines if the storage areas are void and capable of containing the file set 160-N.

In one embodiment, in step 223, the installation process 140-2 ranks each of the available storage areas 170-N from a fastest performance to a slowest performance. In one configuration, a lower cluster number has a higher performance than a higher cluster number.

In step 224, the installation process 140-2 traverses each of the available storage areas 170-N in order of a fastest performance available storage area 170-1 to a slowest performance available storage area 170-N. Thus, in one configuration, the installation process 140-2 installs the file set 160-1 in the first available storage area 170-1 that the installation process 140-2 traverses, since any subsequent available storage areas 170-N will have slower performances than the first available storage area 170-1.

FIG. 8 is a flowchart of the steps performed by the installation process 140-2 when it identifies a performance metric 175-N associated with storage areas in the set of available storage areas 170-N. The algorithm of the installation process 140-2 determines the best available storage area 170-N in which to install the file sets 160-N.

In step 226, the installation process 140-2 compares a performance of a first available storage area 170-1 to a second available storage area 170-2 to determine an optimal available storage area for the file set 160-N. In one configuration, the installation process 140-2 copies the file set 160-N to both a first available storage area 170-1 and a second available storage area 170-2, then compares the read performance between the two to determine the better performing storage area.

In step 227, the installation process 140-2 determines a time constraint for the comparison. The time constraint limits the amount of time the installation process 140-2 spends determining an optimal available storage area in terms of a file performance. The amount of time spent performing comparisons between the performances of a first available storage area 170-1 to a second available storage area 170-2 detracts from any performance gain incurred by the file performance.

In one configuration in step 228, the installation process 140-2 identifies a sequence number associated with each available storage area 170-1 in the set of available storage areas 170-N. The sequence number is indicative of the performance metric 175-1 for that available storage area 170-1.

In step 229, the installation process 140-2 identifies the sequence number as predetermined based on a location of the storage area in a storage medium. In one configuration, the installation process 140-2 installs the files from the file set 160-N first in a lower sequence numbered available storage area 170-1, then a higher sequence numbered available storage area 170-1, without skipping any sequence numbers in between. In other words, if there existed available storage areas 170-1, 170-2, 170-3, 170-4, and 170-5, and if the file set 160-1 was large enough such that it would fill two available storage areas 170-N, the installation process 140-2 would install the file set 160-1 first in available storage area 170-1, and then available storage area 170-2, or perhaps, first in available storage area 170-2, and then available storage area 170-3. However, the installation process 140-2 would not install the file set 160-1 first in available storage area 170-2, then available storage area 170-4 because available storage areas 170-2 and 170-4 are not adjacent. Reading data from consecutive/adjacent storage areas is faster than reading data from storage areas that are far apart.

FIG. 9 is a flowchart of the steps performed by the installation process 140-2 when it positions files from the file set 160-N into at least one storage area of the set of available storage areas 170-N. The storage area is selected based on the performance metrics associated with that storage area.

In step 233, the installation process 140-2 selects, from the set of available storage areas 170-N, at least one available storage area 170-1 having the highest performance metric. In one configuration, if more than one available storage area 170-N is required, the installation process 140-2 attempts to minimize the number of available storage areas 170-N in which to install the file set 160-1. In other words, if there are two available storage areas 170-1 and 170-2 that have the capacity to contain the file set 160-1, and there are also three available storage areas 170-3 and 170-4, and 170-5 that have the capacity to contain the file set 160-1, the installation process 140-2 will choose the two available storage areas 170-1 and 170-2 in an attempt to have the file set 160-1 installed over fewer available storage areas 170-N. The goal of the installation process 140-2 is to reduce the number of seeks (i.e., moving the disk head to a new location) that is time consuming and reduces the performance of the application 180. Consecutive disk reads, on the other hand, are very fast.

In step 234, the installation process 140-2 writes the files from the file set 160-1 into the selected available storage area 170-1 that has the highest performance metric.

In one configuration, in step 235, the installation process 140-2 performs an initial installation of files from the file set 160-1 into the available storage area 170-1 having the highest performance metric. In one configuration an iterative automatic learning mode is used in which data access patterns of the application 180 are logged after the application 180 has been installed. The data access patterns are used to determine optimal repositioning of the file set 160-N.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method of installing an application for access by a computerized device, the computer-implemented method comprising:

identifying a file set comprised of files accessed during operation of the application, wherein identifying the file set includes identifying a plurality of associated files that are accessed by the application during startup of the application, wherein identifying the plurality of associated files includes accessing a list of files, the list of files indicating an order of file access during execution of the application, the list of files having been previously generated by a list generation process that installed and executed the application on a first computerized device, monitored an execution of the application on the first computerized device, recorded a plurality of file identities that are accessed during the execution of the application on the first computerized device, and sorted the plurality of file identities in order of access during the execution of the application on the first computerized device;

identifying a set of available storage areas, accessible a second computerized device, the set of available storage areas having sufficient capacity for storing files in the file set;

identifying a performance metric associated with storage areas in the set of available storage areas; identifying the performance metric including measuring a speed of each available storage area by writing given files as data files, reading the given files as image files, and measuring a time needed to perform each read; and positioning files from the file set into at least one storage area of the set of available storage areas based on the performance metric associated with the storage areas in the set of available storage areas.

2. The method of claim 1 comprising:
executing a file filtering process on the plurality of file identities that are accessed during the execution of the application, the file filtering process converting the plurality of file identities to a plurality of machine independent path and file names for use by at least one other computer on which the application is installed.

3. The method of claim 2 wherein each file name of the plurality of file names is comprised of a variable path file name and a fixed path file name; and
wherein converting the plurality of file names to a plurality of machine independent path names for use by at least one other computer comprises:
computing a plurality of unique file path names from the plurality of file identities, the unique file path names indicating file path names that are unique to the computerized device; and
stripping the variable path file name from each of the plurality of unique file path names to create a plurality of fixed path file names that are not unique to the computerized device.

4. The method of claim 1 wherein identifying the set of available storage areas, accessible to the computerized device, for storing files in the file set comprises:
including in the set of available storage areas those storage areas into which the set of files has already been installed.

5. The method of claim 4 wherein positioning files from the file set into at least one storage area of the set of available storage areas based on the performance metric associated with the storage areas in the set of available storage areas comprises:
moving files from an already installed location to an available storage area having a highest performance metric; and
modifying path names of an installation directory to point to a new location of files.

6. The method of claim 1 wherein identifying the set of available storage areas comprises:
identifying each of the available storage areas as a contiguous group of clusters, each cluster defining a predetermined amount of storage space in a storage medium accessed by the computerized device.

7. The method of claim 6 wherein identifying each of the available storage areas as the contiguous group of clusters comprises:
determining each cluster in the available storage area is void of data.

8. The method of claim 7 wherein identifying the performance metric associated with storage areas in the set of available storage areas comprises:
writing the file set top a first available storage area;
moving the file set to a second available storage area;
reading the file set from the second available storage area; and
determining a performance of the second available storage area.

9. The method of claim 7 wherein identifying the set of available storage areas, accessible to the computerized device, for storing files in the file set comprises:
traversing each of the available storage areas to determine if each of the available storage areas has a capacity to contain the file set.

10. The method of claim 9 wherein traversing each of the available storage areas comprises:
identifying an available storage area for containing the file set.

11. The method of claim 9 wherein traversing each of the available storage areas comprises:
ranking each of the available storage areas from a fastest performance to a slowest performance; and
traversing each of the available storage areas in order of the fastest performance available storage area to the slowest performance available storage area.

12. The method of claim 1 wherein identifying the performance metric associated with storage areas in the set of available storage areas comprises:
comparing a performance of a first available storage area to a second available storage area to determine an optimal available storage area for the file set.

13. The method of claim 12 wherein comparing the performance of the first available storage area to the second available storage area comprises:
determining a time constraint, the time constraint limiting an amount of time spent determining an optimal available storage area in terms of a file performance, the amount of time spent detracting from a gain incurred from the file performance.

14. The method of claim 1 wherein identifying the performance metric associated with storage areas in the set of available storage areas comprises:
identifying a sequence number associated with each available storage area in the set of available storage areas, the sequence number indicative of the performance metric for that available storage area.

15. The method of claim 14 wherein the sequence number is predetermined based on a location of the storage area in a storage medium.

16. The method of claim 1 wherein positioning files from the file set into at least one storage area of the set of available storage areas comprises:
from the set of available storage areas, selecting at least one available storage area having a highest performance metric; and
writing the files from the file set into the selected at least one available storage area that has the highest performance metric.

17. The method of claim 16 wherein selecting at least one available storage area having a highest performance metric comprises:
selecting the at least one available storage area based on an ability to position files from the file set into a minimum number of the at least one available storage area.

18. The method of claim 1 wherein positioning files from the file set into at least one storage area of the set of available storage areas based on the performance metric associated with the storage areas in the set of available storage areas comprises:
performing an initial installation of files into an available storage area having a highest performance metric.

19. The method of claim 1 wherein identifying the performance metric associated with storages areas in the set of available storage areas comprises:
measuring a speed associated with the storage areas, the speed measured by writing a file as data followed by reading the file as an executable file to avoid caching effects, of the file, on the measuring of the speed.

20. The method of claim 1 wherein executing the application on the computerized device comprises:
executing at least a portion of the application, the at least a portion associated with a requirement that the application experience a preferred performance during execution of the at least a portion.

15

21. The method of claim 1 comprising:
   storing the file set in an installation build associated with the application.

22. The method of claim 1 wherein executing the application on the computerized device comprises:
   executing a plurality of application executions to mimic a typical usage of the application.

23. The method of claim 1, wherein identifying a performance metric associated with storage areas in the set of available storage areas includes:
   ranking each of the available storage areas from a fastest performance to a slowest performance;
   traversing each of the available storage areas in order of the fastest performance available storage area to the slowest performance available storage area; and
   determining a time constraint, the time constraint limiting an amount of time spent determining an optimal available storage area in terms of a file performance.

24. A computerized device comprising:
   a memory;
   a processor;
   a communications interface;
   an interconnection mechanism coupling the memory, the processor and the communications interface;
   wherein the memory is encoded with an installation application that when executed on the processor installs an application on the computerized device by performing the operations of:
      identifying a file set comprised of files accessed during operation of the application, wherein identifying the file set includes identifying a plurality of associated files that are accessed by the application during startup of the application, wherein identifying the plurality of associated files includes accessing a list of files, the list of files indicating an order of file access during execution of the application, the list of files having been previously generated by a list generation process that installed and executed the application on a first computerized device, monitored an execution of the application on the first computerized device, recorded a plurality of file identities that are accessed during the execution of the application on the first computerized device, and sorted the plurality of file identities in order of access during the execution of the application on the first computerized device;
      identifying a set of available storage areas, accessible to a second computerized device, the set of available storage areas having sufficient capacity for storing files in the file set;
      identifying a performance metric associated with storage areas in the set of available storage areas, identifying the performance metric including measuring a speed of each available storage area by writing given files as data files, reading the given files as image files, and measuring a time needed to perform each read; and
      positioning files from the file set into at least one storage area of the set of available storage areas based on the performance metric associated with the storage areas in the set of available storage area.

25. The computerized device of claim 24 wherein when the computerized device performs the operation of identifying the set of available storage areas, the computerized device performs the operation of:
   identifying each of the available storage areas as a contiguous group of clusters, each cluster defining a predetermined amount of storage space in a storage medium accessed by the computerized device.

16

26. The computerized device of claim 24 wherein when the computerized device performs the operation of identifying the performance metric associated with storage areas in the set of available storage areas, the computerized device performs the operation of:
   comparing a performance of a first available storage area to a second available storage area to determine an optimal available storage area for the file set.

27. The computerized device of claim 26 wherein when the computerized device performs the operation of comparing the performance of the first available storage area to the second available storage area, the computerized device performs the operation of:
   determining a time constraint, the time constraint limiting an amount of time spent determining an optimal available storage area in terms of a file performance, the amount of time spent detracting from a gain incurred from the file performance.

28. The computerized device of claim 24 wherein when the computerized device performs the operation of positioning files from the file set into at least one storage area of the set of available storage areas, the computerized device performs the operations of:
   from the set of available storage areas, selecting at least one available storage area having a highest performance metric; and
   writing the files from the file set into the selected at least one available storage area that has the highest performance metric.

29. The computerized device of claim 24 wherein when the computerized device performs the operation of positioning files from the file set into at least one storage area of the set of available storage areas based on the performance metrics associated with the at least one storage area, the computerized device performs the operation of:
   performing an initial installation of files into an available storage area having a highest performance metric.

30. A non-transitory computer readable medium encoded with computer programming logic that when executed on a process in a computerized device produces an installation process that performs an installation by causing the computerized device to perform the operations of:
   identifying a file set comprised of files accessed during operation of the application, wherein identifying the file set includes identifying a plurality of associated files that are accessed by the application during startup of the application, wherein identifying the plurality of associated files includes accessing a list of files, the list of files indicating an order of file access during execution of the application, the list of files having been previously generated by a list generation process that installed and executed the application on a first computerized device, monitored an execution of the application on the first computerized device, recorded a plurality of file identities that are accessed during the execution of the application on the first computerized device, and sorted the plurality of file identities in order of access during the execution of the application on the first computerized device;
   identifying a set of available storage areas, accessible to a second computerized device, the set of available storage areas having sufficient capacity for storing files in the file set;
   identifying a performance metric associated with storage areas in the set of available storage areas, identifying the performance metric including measuring a speed of each available storage area by writing given files as data files, reading the given files as image files, and measuring a time needed to perform each read; and positioning files from the file set into at least one storage area of the set of available storage areas based on the performance metric associated with the storage areas in the set of available storage areas.

31. A computerized device comprising:

a memory;

a processor;

a communications interface;

an interconnection mechanism coupling the memory, the processor and the communications interface;

where the memory is encoded with an installation application that when executed on the processor configures the computerized device with a means for installing an application, the means including:

means for identifying a file set comprised of files accessed during operation of the application, wherein means for identifying the file set includes identifying a plurality of associated files that are accessed by the application during startup of the application, wherein identifying the plurality of associated files includes accessing a list of files, the list of files indicating an order of file access during execution of the application, the list of files having been previously generated by a list generation process that installed and executed the application on a first computerized device, monitored an execution of the application on the first computerized device, recorded a plurality of file identities that are accessed during the execution of the application on the first computerized device, and sorted the plurality of file identities in order of access during the execution of the application on the first computerized device;

means for identifying a set of available storage areas, accessible to a second computerized device, the set of available storage areas having sufficient capacity for storing files in the file set;

means for identifying a performance metric associated with storage areas in the set of available storage areas, identifying the performance metric including measuring a speed of each available storage area by writing given files as data files, reading the given files as image files, and measuring a time needed to perform each read; and means for positioning files from the file set into at least one storage area of the set of available storage areas based on the performance metric associated with the storage areas in the set of available storage areas.

* * * * *

UNITED STATES PATENT AND TRADEMARK OFFICE
CERTIFICATE OF CORRECTION

| | | |
|---|---|---|
| PATENT NO. | : 7,926,053 B1 | Page 1 of 1 |
| APPLICATION NO. | : 11/212143 | |
| DATED | : April 12, 2011 | |
| INVENTOR(S) | : Edward R. Rowe et al. | |

It is certified that error appears in the above-identified patent and that said Letters Patent is hereby corrected as shown below:

Claim 1, line 21
Insert the word --to-- following the word "accessible"

Claim 8, line 4
Delete the word "top" and insert the word --to-- in place thereof Claim 19, line 2
Delete the word "storages" and insert the word --storage-- in place thereof Signed and Sealed this
Fourteenth Day of June, 2011

David J. Kappos
*Director of the United States Patent and Trademark Office*

UNITED STATES PATENT AND TRADEMARK OFFICE
CERTIFICATE OF CORRECTION

PATENT NO.         : 7,926,053 B1                                 Page 1 of 1
APPLICATION NO.    : 11/212143
DATED              : April 12, 2011
INVENTOR(S)        : Edward R. Rowe et al.

It is certified that error appears in the above-identified patent and that said Letters Patent is hereby corrected as shown below:

Column 12, line 54 (Claim 1, line 21)
Insert the word --to-- following the word "accessible"

Column 13, line 52 (Claim 8, line 4)
Delete the word "top" and insert the word --to-- in place thereof Column 14, line 56 (Claim 19, line 2)
Delete the word "storages" and insert the word --storage-- in place thereof This certificate supersedes the Certificate of Correction issued June 14, 2011.

Signed and Sealed this
Twelfth Day of July, 2011

David J. Kappos
*Director of the United States Patent and Trademark Office*